United States Patent [19]
Chen et al.

[11] Patent Number: 5,271,159
[45] Date of Patent: Dec. 21, 1993

[54] CIRCULAR SAW GUIDE

[76] Inventors: Andy H. T. Chen, 5567 E. Virginia Beach Blvd., Norfolk, Va. 23502; Alan H. Y. Tsao, 635 Mayflower Rd., Norfolk, Va. 23508

[21] Appl. No.: 46,910

[22] Filed: Mar. 29, 1993

Related U.S. Application Data

[63] Continuation of Ser. No. 831,812, Feb. 6, 1992, abandoned.

[51] Int. Cl.$^5$ ................................................ B43L 7/00
[52] U.S. Cl. ........................................ 33/403; 33/430; 33/456; 33/495
[58] Field of Search .......... 33/403, 430, 465, 495–500, 33/426, 456, 418, 423; 83/743–746

[56] References Cited

U.S. PATENT DOCUMENTS

| | | | |
|---|---|---|---|
| 2,719,548 | 10/1955 | Mitchell | 33/465 X |
| 4,901,444 | 2/1990 | Maschmeier | 33/465 X |
| 5,148,730 | 9/1992 | McCaw | 83/745 |

Primary Examiner—William A. Cuchlinski, Jr.
Assistant Examiner—Alvin Wirthlin

[57] ABSTRACT

A mitering guide device for a circular saw has a protractor including a curved edge with angle markings thereon. An arm is pivotally attached to the protractor and performs in conjunction with a saw guide for defining an angle to be cut. A hinge is attached to the protractor and saw guide through multiple hinge joints for permitting various thicknesses of boards to be cut.

5 Claims, 2 Drawing Sheets

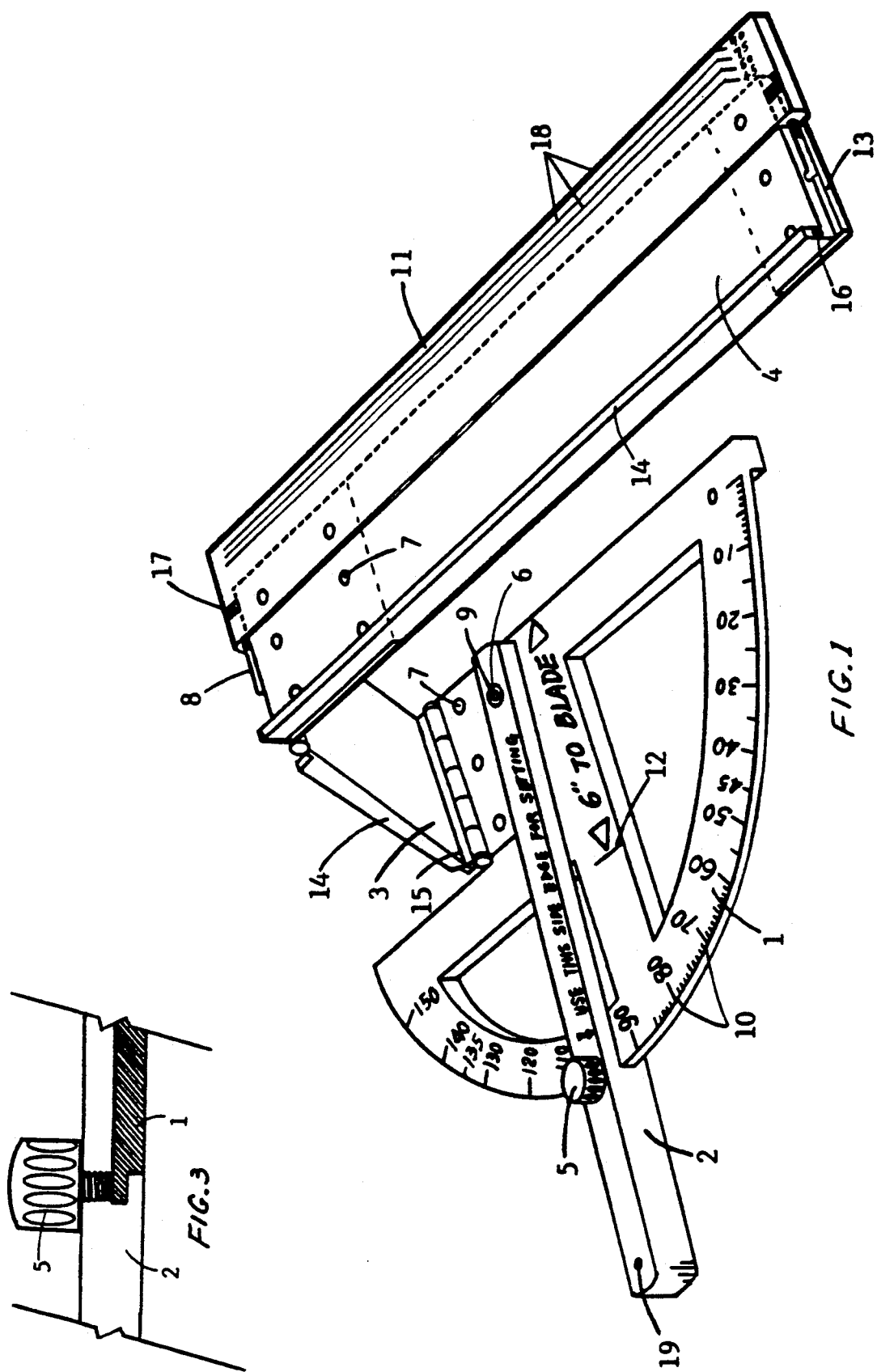

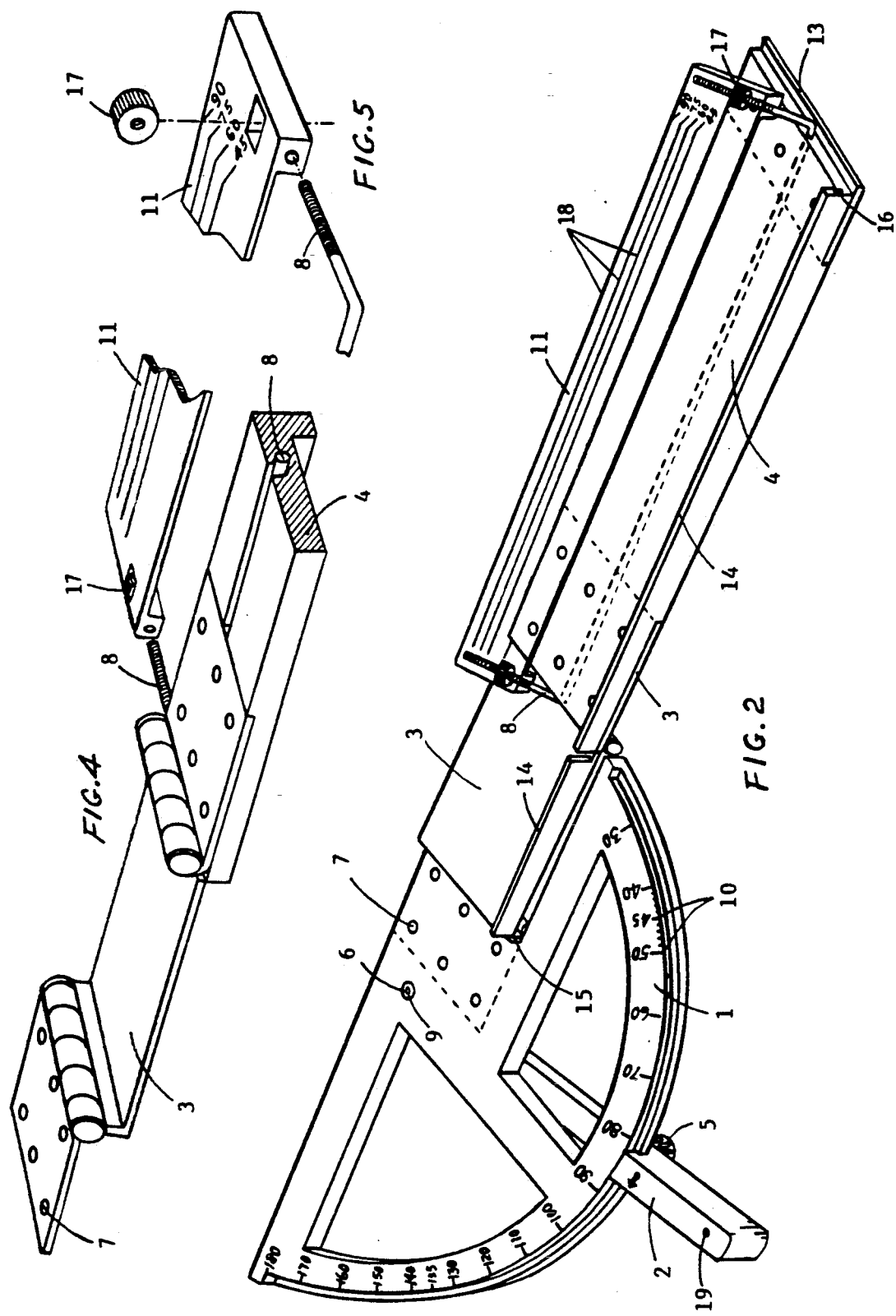

CIRCULAR SAW GUIDE

This application is a continuation-in-part of application Ser. No. 07/831,812, filed Feb. 06, 1992, now abandoned.

BACKGROUND OF THE INVENTION

Uncertainty and errors abound in the process of identifying the accurate cutting position of the blade of a circular saw. The difficulties arise from (1) the lack of a device for identifying the cutting position of the blade on the lumber to be cut and (2) the cutting position of the blade of a circular saw of different brands tends to be different.

This invention relates to a unique hinged guide incorporated into a mitering device to eliminate the uncertainty and errors usually encountered in determining the cutting position of a circular saw blade. A transparent plastic guide attached to the unique hinged guide provides accurate reading of the cutting line of the saw blade on the lumber. The hinged guide allows use of the mitering device on lumber of different thickness, and above or beneath the lumber to be cut.

SUMMARY OF THE INVENTION

One of the objectives of the present invention is to provide a mitering tool with a unique hinged guide, which can eliminate the uncertainty, and therefore likely errors, in identifying the accurate cutting position of a circular saw. The hinged guide, with a transparent plastic overlay, provides accurate reading of the cutting line of the blade, which once adjusted permits either straight or mitered cutting.

Another objective is to provide a tool which can be used above or beneath the lumber to be cut, and can accommodate lumber of various sizes, from a thin board to a 6"×6" beam.

BRIEF DESCRIPTION OF THE DRAWING

FIG. 1. is the top view of the Circular Saw Guide which simplifies mitering bevel cutting, and allows the lumber to be placed on top of the guide for cutting.

FIG. 2. is the view of the reverse side of the guide, to permit the guide to be placed on top of the lumber to be cut.

FIG. 3. is an exploded cross-section view of the knob which secures the arm at a position to define the angle of mitering.

FIG. 4. is the side view of the unique hinge which permits cutting of lumber of various thickness (from a thin board to a 6"×6" beam).

FIG. 5. is an exploded view of the transparent plastic guide which permits viewing and aligning the marked cutting line on the lumber against the marked measure of the plastic guide.

DETAILED DESCRIPTION OF THE PREFERRED EMBODIMENT

FIG. 1 shows the complete view of the Circular Saw Guide, which consists of a metal half circle mitering device (1) plus a unique hinged metal guide to facilitate precision cutting of lumber of various thickness. Degrees of angles (10) are shown on the mitering device. An arm (2) swerves along the half-circle mitering device to indicate the degree of angle by which the lumber is to be cut. The arm is attached to the half-circle piece by a rotating rivet which permits the arm to rotate, and is hollow in the center (6), such that a nail can be driven through the hole (9) of the rivet to secure the guide to a work bench. Another hole (19) at the tip of the arm provides another anchor for nailing the guide to a work bench. The arm can be secured at any angle by turning tight the knob (5). An adhesive plastic ruler is provided, which can be taped on the half-circle device to provide the marking of a fixed (6") distance (12) from the cutting blade of the circular saw which may vary with different brands.

The unique hinged guide is attached to the half-circle device by a hinge (3) which is raised above the half-circle device by a distance (15)—equal to the thickness of the arm—to permit the hinge to fold down above the arm. The hinge connects the half-circle device to the guide (4), by 12 rivets (7), 6 rivets on each end of the hinge. One of the flanges (14) of both the hinge and the guide is raised to permit butting the circular saw against the right edge of the flange as seen in FIG. 1.

The metal guide (4) is equipped with a transparent plastic guide (11) with mitering markings (18), which can be flipped between two positions: (a) flipping the overlay to the right to the forward position (as seen in FIG. 1) to extend beyond the metal guide over a board to be cut, which permits viewing of the cutting position of the blade on the board through the overlay, and (b) flipping the overlay to the left to the backward position to the left of the raised edge of the guide to clear itself from the metal guide to permit cutting. The plastic overlay is attached to the metal guide by a U-shaped rod (8) (see FIG. 2) which rests on a lip (13) of the guide. A locking device (16) secures the plastic guide (11) in the backward position.

FIG. 2. shows the reverse side of the tool, which can be placed on top of the lumber regardless of its thickness, to facilitate cutting.

FIG. 3. shows the cross-section view of the arm (2) where the knob (5) can be used to secure the arm on the half-circle device at any desirable degree of angle.

FIG. 4. is the exploded view of the unique hinge.

FIG. 5. is the exploded view of the plastic guide (11), with two adjustable screws (17) to extend or contract the plastic guide against the metal guide so as to compensate for the difference in positions the circular saw blade of various brands may pose with reference to the guide of the saw.

We claim:

1. A mitering guide device for a circular saw comprising:
   a protractor having a semi-circular body, an upper surface thereof defining a plane;
   an arm pivotally attached to said protractor about an axis perpendicular to said plane, said arm having first securing means for fixing said arm to a work surface, and second securing means for adjustably securing said arm to said protractor thereby defining an angle between said arm and said protractor;
   a hinge having a first end and a second end, said hinge being attached to said protractor by a first hinge joint located at said first end;
   a guide being attached to said hinge by a second hinge joint located at said second end; said first and second hinge joints having an axis of rotation parallel to said plane, said guide comprising a first straight edge for guiding a circular saw therealong.

2. The mitering guide device of claim 1, further comprising an overlay adjustably attached to said guide.

3. The mitering guide device of claim 2, wherein said overlay is transparent.

4. The mitering guide device of claim 1, wherein said first securing means comprises a hole at each end of said arm for permitting a fastening device to be driven therethrough.

5. The mitering guide device of claim 1, wherein said second securing means comprises a threaded knob threadably engaging said arm, a lower end of said knob being adapted to securely engage said protractor means.

* * * * *